June 13, 1933.  H. CHRISTIANSEN  1,913,792
DEVICE FOR PUSHING VEHICLES
Filed Nov. 12, 1930  5 Sheets-Sheet 1
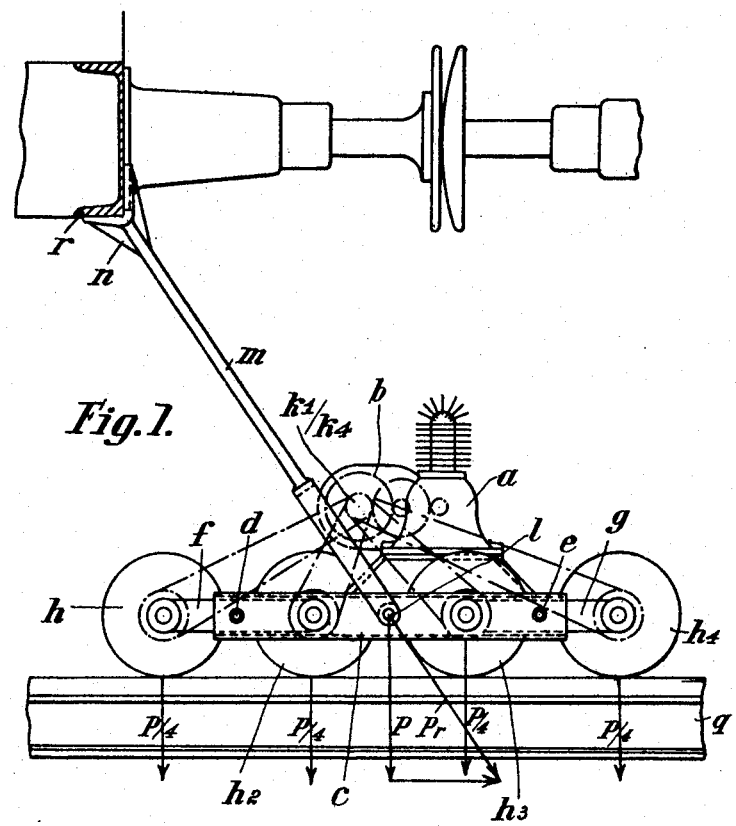
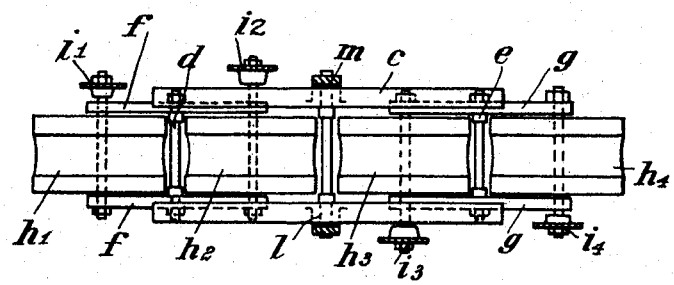

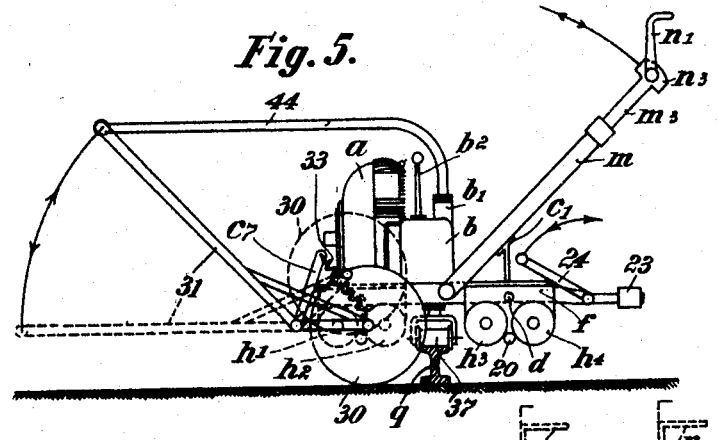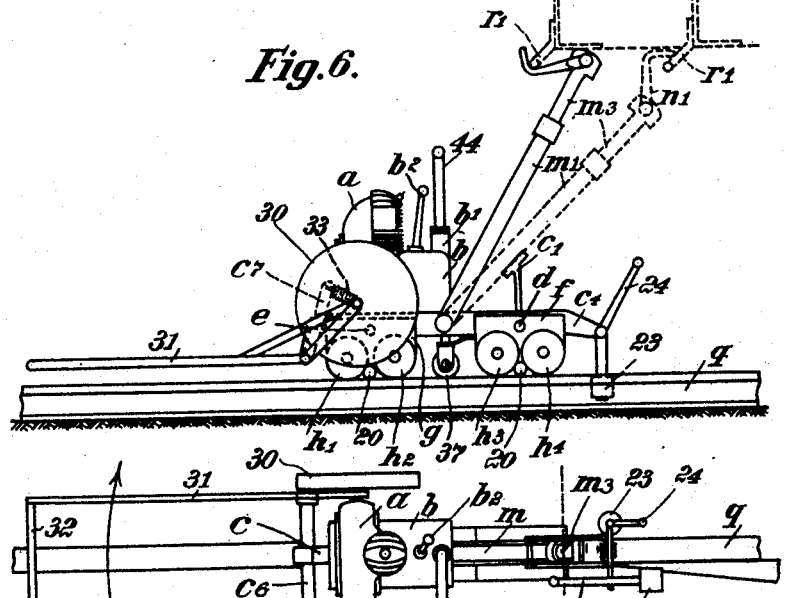

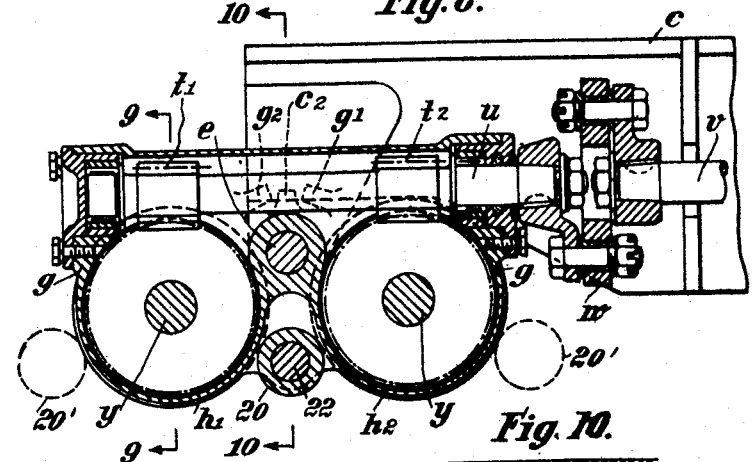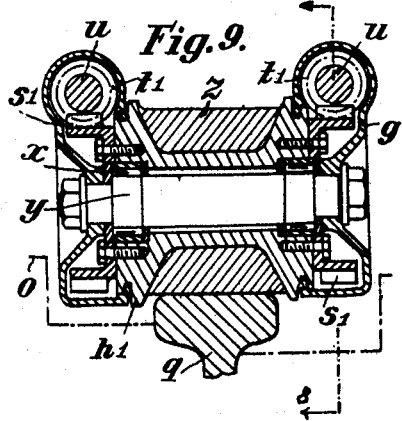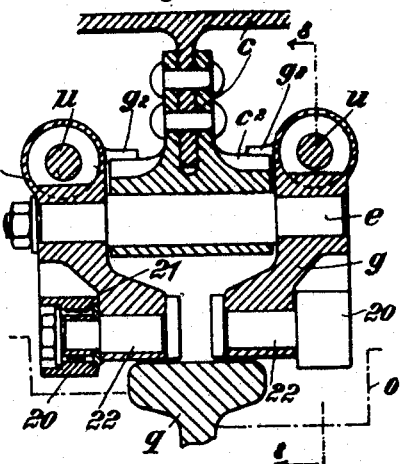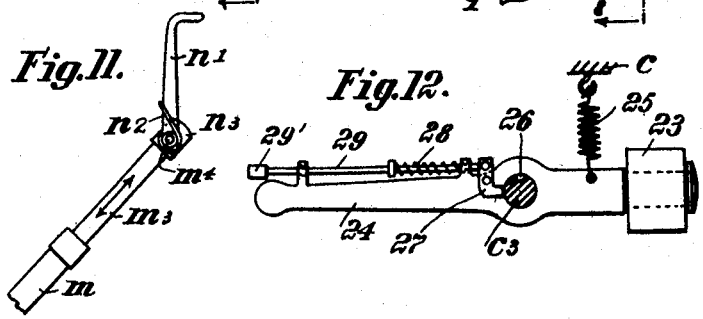

June 13, 1933. H. CHRISTIANSEN 1,913,792
DEVICE FOR PUSHING VEHICLES
Filed Nov. 12, 1930 5 Sheets—Sheet 5
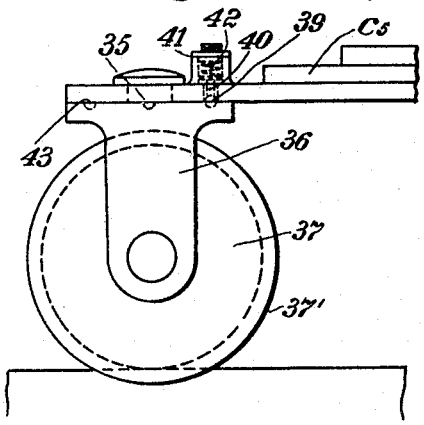
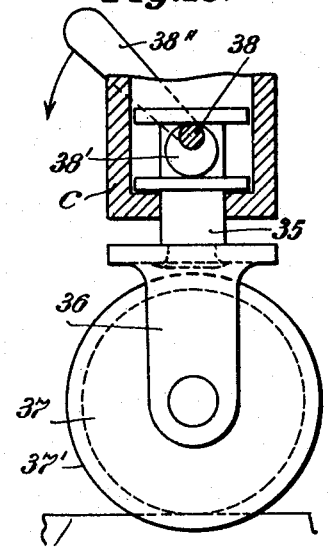
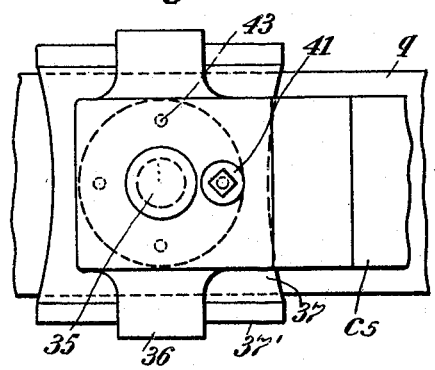
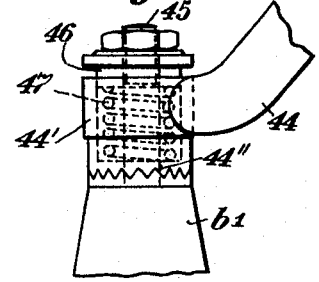
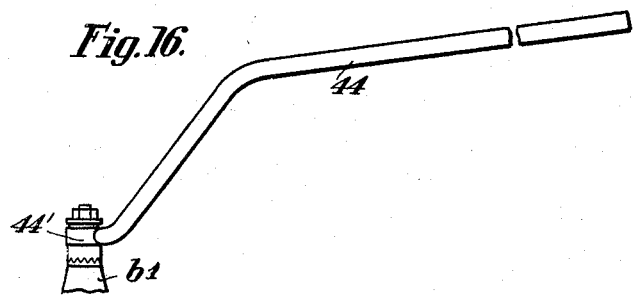
Inventor,
Heinrich Christiansen
By Henry Orth Jr
Atty.

UNITED STATES PATENT OFFICE

HEINRICH CHRISTIANSEN, OF PINNEBERG, GERMANY

DEVICE FOR PUSHING VEHICLES

Application filed November 12, 1930, Serial No. 495,238, and in Germany November 16, 1929.

The invention relates to a device running on several wheels preferably provided with a driving motor, for pushing vehicles, and which is intended to serve particularly for moving forward and marshalling single railway vehicles or a few of such vehicles coupled with one another.

Apart from those arrangements which act upon the wheels of the vehicle to be moved, two kinds of vehicle-pushers are known. On the one hand it has been proposed to make the hauler so heavy that the necessary ground-pressure is produced by its own weight. Such a heavy construction of the hauler of course involves great expense and also other disadvantages. It has therefore also been proposed to increase the ground-pressure by slightly lifting the vehicle to be moved by means of a device carried by the vehicle-pusher. Such vehicle-lifters can be formed comparatively easily, but the lifting and re-lowering of the vehicle takes a considerable amount of time. Further, the pusher cannot always and instantaneously be quickly released from the vehicle, for example, when the vehicle runs down steep gradients, whereby accidents may occasionally happen.

A vehicle-pusher is provided by the present invention with which likewise the weight of the vehicle to be moved is drawn upon for producing the necessary adhesion pressure between the pusher and the ground, but with which no lengthy lifting and re-lowering of the vehicle is necessary, and the release of the pusher from the vehicle can be effected every time instantaneously and without the slightest difficulty.

The invention consists herein, that a comparatively easily constructed device running on several wheels, preferably provided with a driving motor, engages with the vehicle (car or the like) to be moved by means of a rod sloping forward in the direction of travel and upwardly. The device can be so formed that it runs with a plurality of wheels upon one rail, but under certain circumstances both rails also can be used for guiding the machine, or the device may also run upon the ordinary ground.

By reason of the fact that the push-rod engaging with the vehicle is directed from the pusher in the direction of travel sloping forward and upwardly, a pressure component directed perpendicularly to the rail or to the ground is transmitted to the vehicle-pusher in consequence of the weight of the vehicle; this pressure component can be so dimensioned, by corresponding selection of the angle of engagement of the push-rod, that the friction between the wheels of the pusher and the ground or rails necessary for the movement of the vehicle is produced.

In order to transmit the pressure transmitted through the push-rod to the vehicle-pusher as uniformly as possible to all the running wheels collectively, preferably all of which are driven, the push-rod engages, according to the invention, with the frame of the pusher formed as a balance-beam, the arrangement being such that the running wheels are connected with the ends of the frame, in some cases with the intermediate insertion of further balance-beams. The lever arms of the balance-beams may be of equal length, but under some circumstances, for example when an uneven number of running wheels are used, they may also be unequal.

Further features of the invention consist in the formation of the tread of the running wheels, in the formation and arrangement of a device for mounting the vehicle-pusher upon a track, in the formation and arrangement of the guiding and driving arrangements, in the formation and arrangement for transporting the vehicle-pusher, and in the formation and arrangement of a number of further details which will be seen from the accompanying drawings and the description of the same relating to some constructional examples.

In the drawings one constructional example is illustrated in Figs. 1–4 and a second constructional example in Figs. 5–17, the said examples being in part more or less diagrammatic.

Fig. 1 is a constructional example of the vehicle-pusher in side view;

Fig. 3 is a plan of the frame of the vehicle-pusher illustrated in Figs. 1 and 2 without motor and driving gear;

Fig. 5 shows diagrammatically in side view a modified constructional example of a vehicle-pusher according to the invention when mounted upon a rail;

Fig. 6 shows the vehicle-pusher illustrated in Fig. 5 in side view in working position upon a rail;

Fig. 7 is a plan corresponding to Fig. 6;

Fig. 8 shows partly in longitudinal section on the lines 8—8 of Figs. 9 and 10 the drive of a pair of running wheels;

Figs. 9 and 10 show longitudinal sections on the similarly numbered section lines of Fig. 8;

Fig. 11 shows on a somewhat larger scale the upper end of the pressure rod illustrated in Figs. 5 and 6;

Fig. 12 shows the arangement and formation of guide rollers;

Figs. 13 and 14 show in side view and in plan the arrangement and formation of a roller designed for mounting the vehicle-pusher upon a rail;

Fig. 15 shows in side view a somewhat modified arrangement of the roller illustrated in Fig. 13;

Figs. 16 and 17 show the details of the formation of the guide rod employed for guiding the vehicle-pusher.

With the constructional example illustrated in Figs. 1–4 an internal combustion engine $a$ and a change speed gear $b$ are combined in a single casting which is secured upon a frame $c$. This frame $c$ forms a balance-beam, in the pivots $d$ and $e$ of which two further short balance-beams $f$ and $g$ are pivotally guided. In the ends of the smaller beams $f$ and $g$ the running wheels $h1$ and $h2$, or $h3$ and $h4$ are rotatably supported. These running wheels $h1$ to $h4$ are rigidly connected with chain wheels $i1$ to $i4$, which are connected by chains $j1$ to $j4$ with chain wheels $k1$ to $k4$ of the driving shaft.

To facilitate the arrangement of the various chain wheels upon the driving shaft of the gear $b$, also to avoid a one-sided unsymmetrical formation of the pusher, the transmission members preferably in the form of chains $k1$, $k2$ serving for driving a part of the running wheels $h1$, $h2$ are arranged on one side of the vehicle-pusher and engage with one end of the driving shaft, while the transmission members, preferably also in the form of chains $k3$, $k4$ serving for driving the remaining running wheels $h3$, $h4$ are arranged on the other side and engage with the other end of the driving shaft.

In the pivot $l$ of the pusher frame $c$ a rod $m$ is pivotally connected at its end which is formed as a fork for this purpose. This rod $m$ serves to transmit the pressure from the pusher to the vehicle to be moved. The pressure-rod $m$ has at its upper end an angle piece $n$ open to the front and above, with which the pressure rod can engage under the rear edge or the rear iron frame-member of a car.

In consequence of the inclined arrangement of the pressure-rod $m$ an obliquely and rearwardly directed pressure $Pr$ is exerted upon the vehicle-pusher by the vehicle to be moved. This pressure $Pr$ is divided into a component $P$ taken up by the rail or the ground and directed vertically downwards and a horizontal component to be overcome by the driving motor. In consequence of the balance-beam system the adhesion pressure $Pr$ proceeding from the pressure rod, together with the weight of the pusher, is distributed evenly upon all four wheels in the example. With four wheels each wheel has to transmit the pressure $P/4$.

Figure 2:
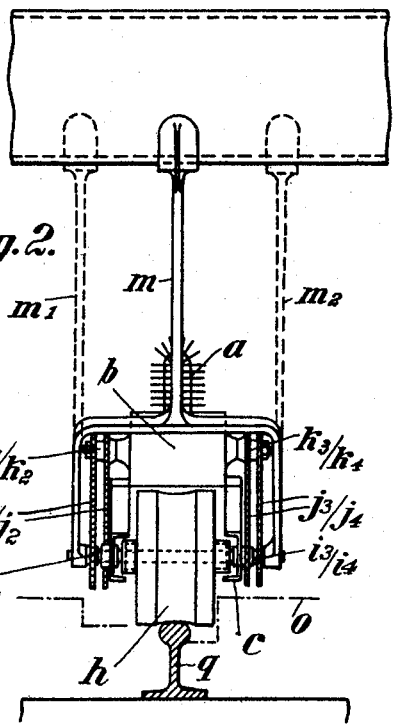
Fig. 2 is a front-view corresponding to Fig. 1.

Instead of making the lower part of the pressure rod $m$ forked two pressure rods $m1$ and $m2$ may be used as shown in dotted lines in Fig. 2; also the pressure rod or rods might be caused to engage with the buffer or other suitable point of the vehicle.

Figure 4:
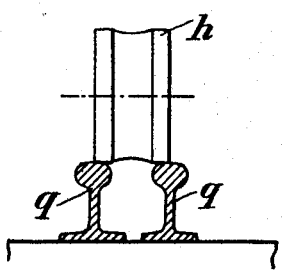
Fig. 4 shows the position of a running wheel at a cross-over.

The running wheels are provided with a complete rim of rubber or a band of another material with high friction co-efficient, in order to keep the ground-pressure as low as possible. The running wheels are kept so wide that even at points, cross-overs and the like they always engage the rail either in the middle of the wheel (Fig. 2) or with the outer part (Fig. 4). On the other hand the width of the wheel must not exceed a certain dimension (which with the present profiles amounts to about 150 m. m.) in order that the profile line (see Fig. 2) may remain clear.

With the constructional example illustrated in Figs. 5–17 the construction of the vehicle-pusher in general is essentially the same as in the case of the previously described example; for the parts which correspond with one another the same reference letters have been used.

The pressure rod consists of two parts $m$ and $m3$ preferably adapted to be pushed one into the other telescopically or one screwed into the other and displaceable relatively to one another in the longitudinal direction and adapted to be rigidly connected together in any desired position. By this formation the total length of the pressure rod $m$, $m3$ can be adjusted within comparatively wide limits corresponding to the different heights of vehicles.

The free end of the pressure rod $m3$ is connected with a gripper by means of which the vehicle to be pushed is automatically engaged when the pusher is moved forward, and the pressure rod already partly raised by a support $c1$ or the like is brought automatically into the correct position relatively to the same. In the example the gripper consists of a hook or the line $n1$ which is connected to the free end of the pressure rod $m3$ by means of a pin $m4$ while a spring $n2$ tends to hold this hook in the approximately vertical position illustrated in Figs. 5–11. On the pusher approaching a vehicle the pressure rod $m$ rests against the projection $c1$ of the vehicle frame $c$, at first only the upwardly projecting gripper $n1$ engaging a part of the vehicle, for example, the handle $r1$ fixed underneath the buffer on the end support $r$; upon further forward movement the head $n3$ of the pressure rod is raised by the hook $n1$ until it abuts against the underside of the end support $r$.

Upon the pushing action being exerted the pressure then is transmitted mainly by the friction between the support $r$ and the head $n3$ of the pressure rod, while the hook $n1$ has to carry no material load.

For the drive the wheels $h1$—$h4$ are connected on both sides with worm wheels $s1$—$s4$, in which engage worms $t1$—$t2$ carried by two shafts $u$. The shafts $u$ are supported in the vehicle frame-beams $g$ which are formed after the manner of casings as is also the case with the shafts of the wheel $h1$, and the drive of the shafts takes place with the intermediate connection of a coupling $w$ from shaft $v$ driven by the motor. With the double drive of each of the wheels the axles are completely relieved of bending stresses which are caused with the previous constructional example by the one-side drive.

For the limitation of the movement of oscillation of the vehicle frame-beam $g$ relatively to the vehicle frame $c$ abutments $c2$ and $g1$, $g2$ are formed on both sides. The running wheels $h1$—$h4$ freely rotate upon roller bearings $x$ around the bolts $y$ fixed in the casing $g$. The running wheels are surrounded with a band $z$ consisting of rubber, leather or any other suitable material which provides sufficiently great adhesion resistance upon the rails, and are provided on both sides with low wheel flanges.

For the sake of the drive on both sides the wheels $h1$—$h4$ are not formed so wide that they would run upon both rails at cross-overs, points and the like. Moreover the running wheels $h1$—$h4$ together with the parts of the casing $g$ serving for receiving the worm-wheels $s1$ may be only so wide that the outer edges of the parts $g$ of the casing do not extend over the profile line $o$ of the rails $q$ when laid in the paving (see Fig. 9). In order to facilitate passing through cross-overs or the like, notwithstanding this narrow formation of the actual running wheels, pairs of co-axial auxiliary running wheels or rollers 20 are connected with the horizontal frame-beams $g$ or $f$ besides the running wheels proper. The treads of a pair of auxiliary rollers are arranged so far from one another that they do not lie upon a rail when travelling forward (Fig. 10), but on the other hand also they must not exceed the profile line $o$. When travelling over cross-overs or the like on the contrary (see Fig. 4) the rollers 20 come upon the two rails as soon as one of the wheels $h1$—$h4$ proper can no longer support the horizontal beam owing to the intermediate space between the two rails. The auxiliary rollers 20 may be rotatable around bolts 22 inserted rigidly in the case $g$ or $f$, and upon roller bearings 21.

With the constructional example illustrated each horizontal beam has only a pair of rollers 20 arranged below its pivot of swing $e$; but in many cases it will be more suitable to use for each horizontal beam two such pairs of rollers 20' and to arrange them as is indicated in Fig. 8 in dotted lines.

For guiding the vehicle-pusher at bends, points, or the like, two guide rollers 23 are employed which are arranged on both sides of the rail $q$, which rollers are carried by the one end of a two arm lever 24. The levers 24 are rotatable about a shaft $c3$ which is carried by a forwardly projecting prolongation $c4$ of the vehicle frame $c$. Springs 25 inserted between the levers 24 and the vehicle frame $c$ tend to hold the guide roller 20 in the position illustrated in Figs. 5 and 12 out of engagement with the rail 2. For holding the rollers 23 in the working position illustrated in Fig. 6 the shaft $c3$ is provided with a groove 26 into which can enter a catch-nose 27 supported pivotally upon the lever 24. A spring 28 presses the catch-nose 27 against the shaft $c3$ or into the groove 26 by means of a rod 29. For the relief of the connection between the groove 26 and the nose 27 the rod 29 can be displaced against the action of the spring 28 by pressure upon the knob 29'.

In order that at points the vehicle-pusher may not be guided by the rollers 23 in a different direction to that of the vehicle to be pushed, only those guide rollers 23 may be lowered, as shown in Fig. 7, which lie upon the same side as the flange of the wheel located in front of the vehicle-pusher.

In order to enable the entire pusher to be easily transported it is provided with two comparatively large running wheels 30 arranged on both sides of the driving wheels $h1$, $h2$. These running wheels 30 are carried by the ends of two-arm levers 31 the other ends of which are connected with one another by a transverse piece 32 serving as a handle. The pivot pins of the levers 31 are formed by a shaft $c6$ which is secured at the back end of the vehicle frame $c$. Between a projection $c7$ of the vehicle frame and the ends carrying the wheels 30 springs 33 are inserted and hold the wheels 30 usually in the position just clear of the ground as represented in Fig. 5 in dotted lines and in Fig. 6 in full lines.

Against the action of the springs 33 the levers 31 can be rotated into the position shown in full lines in Fig. 5 and be secured in this position (in a particularly desirable manner hereinafter to be described). In this position the treads of the wheels 33 are located below the treads of the wheels $h1—h4$, so that the pusher runs upon the wheels 30. The axis of the wheels 30 is preferably so arranged that as the wheel is set in motion it comes into the neighborhood of the vertical transverse plane occupied by the centre of gravity of the entire vehicle-pusher.

Between the two horizontal beams $g$ and $f$ is located a part, preferably formed by a roller 37 carried by a fork 36, carried by the frame $c$ or by a spring $c5$ rigidly connected with the frame, projecting downwardly and adapted to oscillate about a vertical pin 35, which part can embrace the head of a rail $q$ on both sides with two flanges $37'$. For mounting the vehicle-pusher upon a rail $q$ projecting below the ground level the pusher is approached in the manner shown in Fig. 5 from the side of the rail and with the roller 37, the flanges $37'$ of which run parallel to the rail $q$, is mounted upon the rail. Then the wheels 30 are raised and the pusher is oscillated about 90° with stationary rollers 37, until the running wheels $h1—h4$ are located upon the rail. The removal of the pusher from a rail takes place in the opposite manner. Preferably the roller 37 is arranged approximately below the centre of gravity of the entire vehicle-pusher.

When the running roller 37 is supported by means of a spring $c5$ (Fig. 13) the spring is made so powerful that it is able to carry approximately the weight of the vehicle-pusher but on running against a car the spring is compressed together by the pressure of the rod $m$ and takes up only an inconsiderable part of this pressure, while the main pressure is transmitted to the driven wheels $h1—h4$. For raising or mounting the roller 37 an eccentric $38'$ supported rotatably about an axis 38 in the frame $c$ can engage against the fork 36 or against a pin 35, which eccentric is adapted to be oscillated by means of a handle $38''$.

In order that the axis of the roller 37 may remain always in the necessary manner parallel or perpendicular to the longitudinal axis of the vehicle-pusher when the latter is being mounted or dismounted, a stopping device is provided which yieldingly holds the oscillating roller in these two positions. With the constructional example illustrated in Figs. 13 and 14 the stopping device consists of a ball 39 displaceable in a boring in the end of the spring $c5$, which ball is pressed downwardly by means of a pin 40 by a spring 42 compressed into a casing 41. The plate-like upper side of the fork 36 has four recesses 43 into which the balls 39 are pressed, and thereby can hold the fork 36 together with the roller 37 in the desired positions. A similar stopping device can of course also be provided with the constructional example illustrated in Fig. 15.

In order to prevent a tilting of the pusher running upon a rail, the guide rod 44 is provided on the frame $c$ or on the casing of the gear wheel $d$ rotatable exclusively about a vertical axis, the outer part of which rod runs completely or approximately horizontal. The guide rod is of such a length that the operator can run near to the vehicle to be pushed and can readily perceive any obstructions opposing the vehicle. By the fact that the rod is rotatable about a vertical axis it can be rotated backwards on passing any obstructions standing quite near to the track, such as lighting masts, signal masts, or the like; further it can be rotated completely to the other side when the pusher does not run on the right hand track in the manner represented in Fig. 7 but on the left hand track. Finally the guide rod 44 can be placed in the direction of travel and be used for the purpose of holding, in the raised position illustrated in Fig. 5, the connecting rod 32 between the levers 31 when the pusher is running upon the wheels 30.

For connecting the guide rod 44 to a projection $b1$ of the gear wheel casing or of the frame $c$ the inner end of the rod 44 is connected with a casing $44'$ (Figs. 16 and 17). The casing $44'$ is closed below by a front wall $44''$ having only a central boring. This front wall has teeth or the like which remain in engagement with corresponding teeth formed on the projection $b1$. The casing $44'$ surrounds a bolt 45 connected with the projection $b1$ against which abuts the one end of a spring 47 likewise surrounded by the casing by means of a suitable intermediate piece 46, while the other end of the spring presses from within upon the downwardly projecting front wall $44''$ of the casing $44'$ and hereby holds the teeth on the casing and on the projection $b1$ in engagement with one another. The form and arrangement of the teeth also the strength of the spring are so selected that the guide rod can be oscillated by a comparatively light pressure exerted upon the end of the rod.

The guide rod is arranged on the vehicle-pusher in such a manner that the operator holding this rod can easily manage the motor, the gear wheel lever $b2$, and the lever 24 carrying the guide rollers 23. The levers serving for the management of the motor and of the gear wheel can also be arranged on the guide rod 44 with the use of a suitable transmission medium.

It is obvious that many modifications of the constructional example illustrated are possible. More than four wheels could be arranged in order to keep the adhesion pressure upon the separate wheels correspondingly lower, and with a suitable arrangement of the balance-beams the total pressure could be completely uniformly distributed upon all the wheels. With an uneven number of running wheels one running wheel would have to be arranged on the longer arm of a balance-beam with unequal arms, of which the shorter arm engages with the central point of a further balance-beam carrying two running wheels.

The uniform distribution of the adhesion pressure of the wheels is very important, in order to avoid over-loading one or other of the wheels in view of the large forces dealt with. Further the peculiar lever system facilitates the yielding or turning out of individual wheels and the adaptation of these wheels to their support, particularly with uneven ground, that is, for example with curved rails, rail joints, at junctions, factory yards and so forth, where in places the paving is uneven and occasionally even lies higher than the rails.

The gearing $b$ consists preferably of a three-speed gear which can start with very small transmission ratio and the speed of travel can then gradually be increased. Further, preferably a gearing is used with which the toothed wheels are continuously in mesh so that the change over can be made without intermediate connection from one pair of toothed wheels to another.

I claim:—

1. A car pusher of the kind described comprising a frame carried by several running wheels, driving means supported by the frame and acting upon at least some of the running wheels, a rod device disposed on the frame and directed upwards and forwards at a slope in the direction of travel, and means whereby a vertical downwardly directed pressure component transmitted to the car pusher by the pushing rod serves for the increase of the adhesive pressure of the running wheels.

2. A car pusher according to claim 1 comprising a double armed balance beam device forming the travelling frame of the car pusher having running wheels at its ends to the centre of which beam the rod device is pivoted and means whereby the weight of the car pusher and the vertical pressure component transmitted by the pressure rod are divided among the driven running wheels on even or uneven ground.

3. A car pusher according to claim 1 comprising a number of running wheels, the entire width of the surfaces of said wheels is greater than the greatest distance apart of the adjacent track rails in junctions, yards and the like, but smaller than the double distance between rail centres and profile lines in rails laid in paved places and the like.

4. A car pusher comprising a frame, running wheels supporting the frame, means for exerting a pressure on a car by said frame and said wheels, worm wheels connected with the running wheels, the diameter of said running wheels being a little greater than the diameter of the worm wheels, and worms in engagement with the worm wheels and fastened to a driving shaft disposed above the axes of the running wheels.

5. A car pusher according to claim 4 in which the distance between the centre of the running wheel and the outer edge of the worm wheel connected with the running wheel is smaller than the distance between the centre of the rails and the profile line in rails disposed in pavements or the like.

6. A car pusher according to claim 1 comprising driven running wheels and pairs of subsidiary running wheels, the running surfaces of said driven wheels during travel of the car pusher on a rail lying on the head of said rail and the running surfaces of a pair of subsidiary running wheels in travel over a crossing or the like lying on the heads of the two neighbouring rails, the distance between the outer edge of the running surfaces of each subsidiary pair of running wheels being greater than the greatest free distance of the two neighbouring rails at crossings, switch points, or the like, but smaller than double the distance between the rails and the profile line in rails laid in pavement or the like.

7. A car pusher according to claim 1 comprising a member secured to the frame, being rotatable about a vertical axis and projecting downwardly of said frame, downwardly projecting flanges connected with said member and fit to embrace the two sides of a rail, and means for raising and lowering said member with its under-surface either under or over the under-surface of the running wheels, said member serving for keeping the car pusher on a rail.

8. A car pusher according to claim 1 comprising a guide roller carried by a rocking lever disposed on each side of the car pusher at the front end of the frame, each of said levers and rollers being operative independently of each other.

9. A car pusher according to claim 1 comprising a frame and a guide rod secured to the frame and being rotatable about a vertical axis and laterally projecting from said axis, the length of said rod being such that if arranged at right angle to the direction of travel of the car pusher it projects beyond the side wall of the car to be pushed but ends before the side wall of a car running on a neighbour track.

10. A car pusher according to claim 1 comprising a frame and a pushing rod device, said rod device before acting upon a car being supported by a member of the frame in such a position that the rigid upper end of the rod device lies a little below the lower rear edge of the car to be pushed, gripping means being connected to and projecting upwardly from the upper rigid end of the rod device, and means for raising the upper rigid end of the rod device up to the undersurface of the car by the engagement of the gripping means and a part of the car.

11. A car pusher according to claim 1 comprising driving means arranged in the direction of travel on the one side of the car pusher and driving means arranged in the direction of travel on the other side of the car pusher and means for connecting each driven running wheel with the driving means on each side of the car pusher.

12. A car pusher comprising a double-armed balance beam device forming the travelling frame of the car pusher having running wheels at its ends to the centre of which beam the rod device is pivoted, and a toothed drive and a driving shaft disposed in a container which forms the balance beam.

13. A car pusher according to claim 1, comprising on each side a transport wheel of relatively great diameter and a double-armed lever being journaled to the frame of the car pusher, one arm of said lever supporting said wheels and the other forming a handle for lowering or raising said wheels relatively to the frame of the car pusher.

In testimony whereof I affix my signature.

HEINRICH CHRISTIANSEN.